M. J. HEALY.
APPARATUS FOR DRAWING HOLLOW GLASS ARTICLES.
APPLICATION FILED MAR. 12, 1910.
1,008,465.
Patented Nov. 14, 1911.
5 SHEETS—SHEET 1.
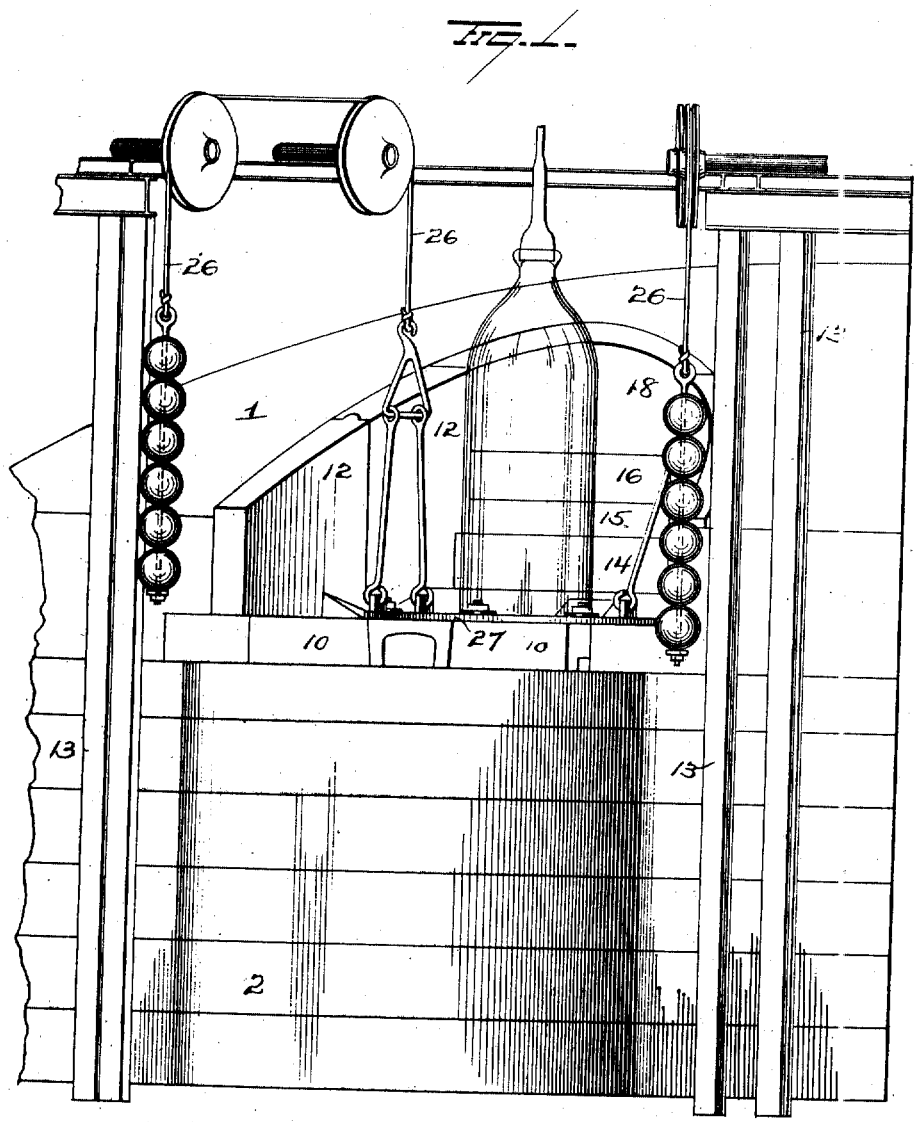

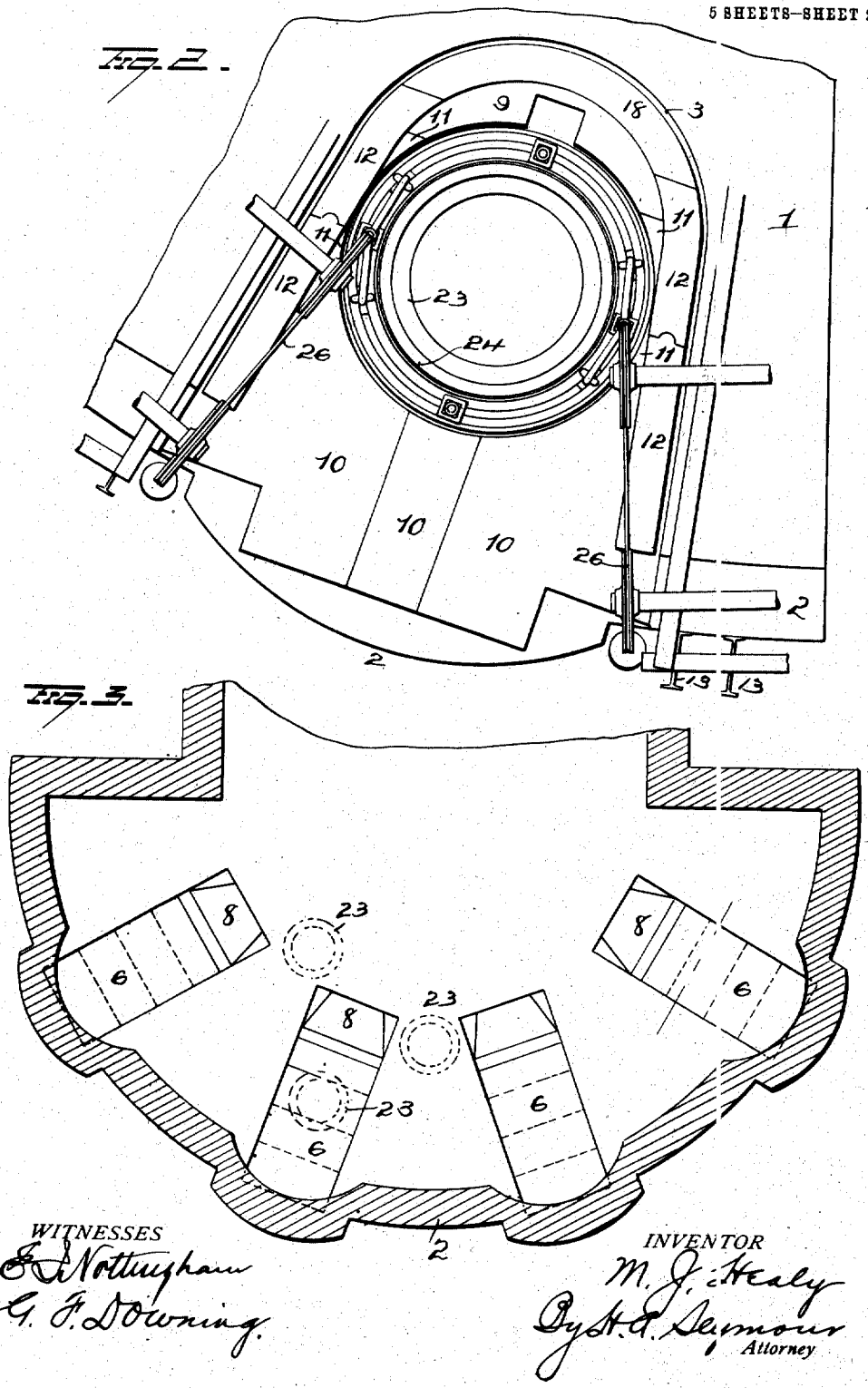

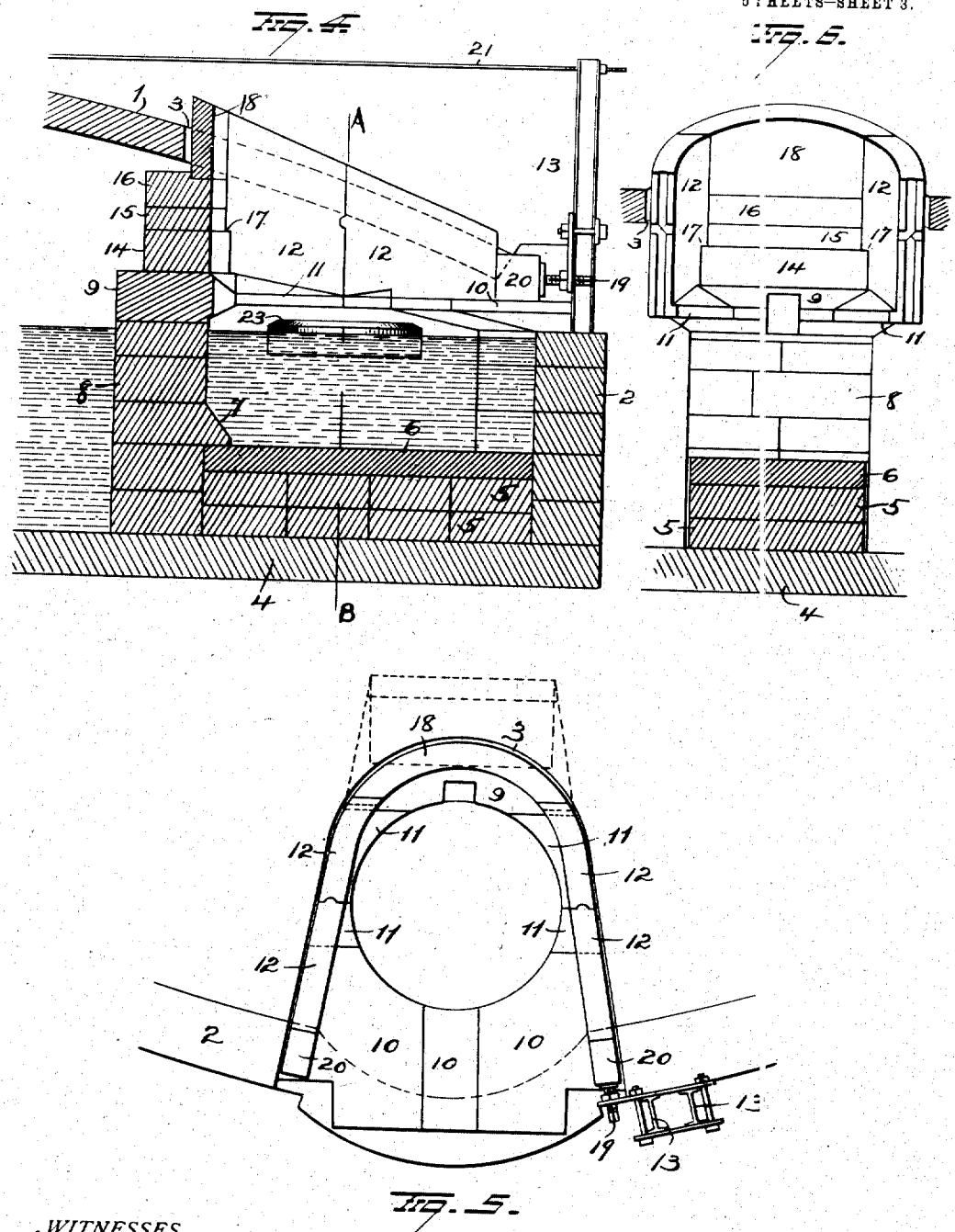

M. J. HEALY.
APPARATUS FOR DRAWING HOLLOW GLASS ARTICLES.
APPLICATION FILED MAR. 12, 1910.
1,008,465.
Patented Nov. 14, 1911.
5 SHEETS—SHEET 4.
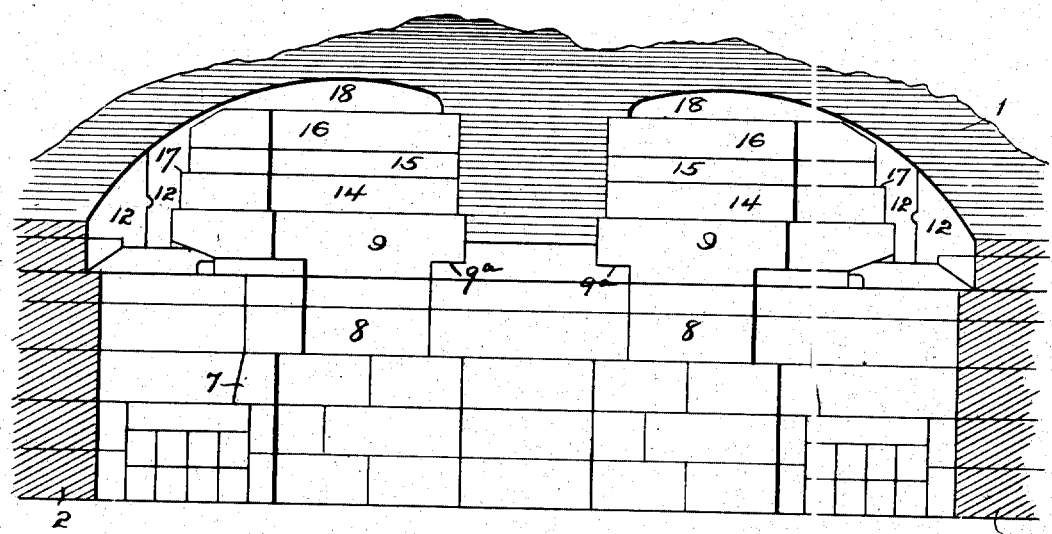
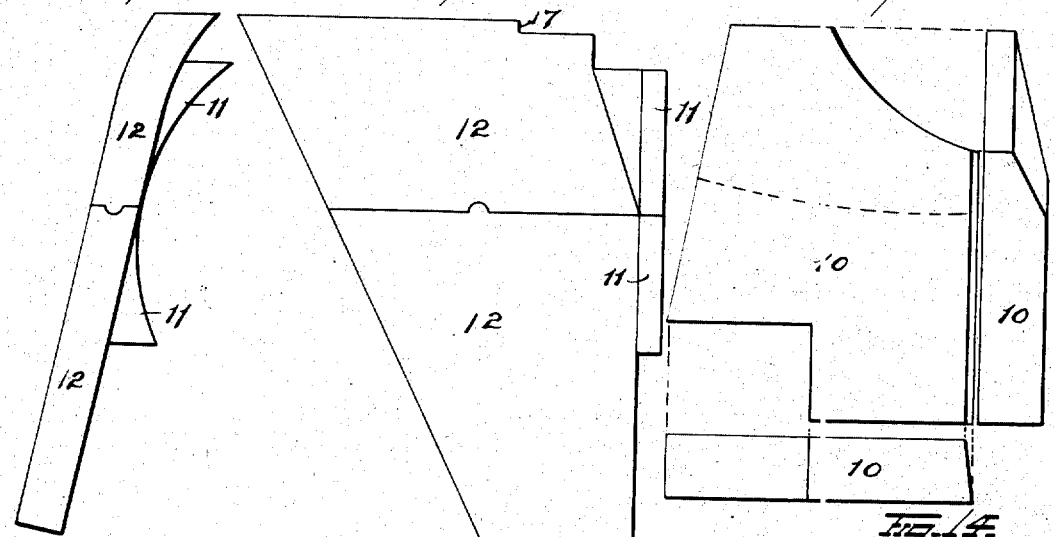
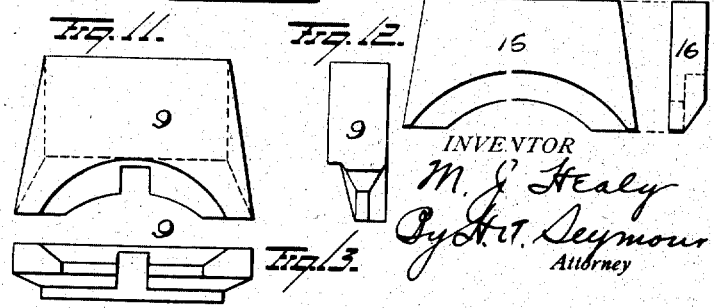

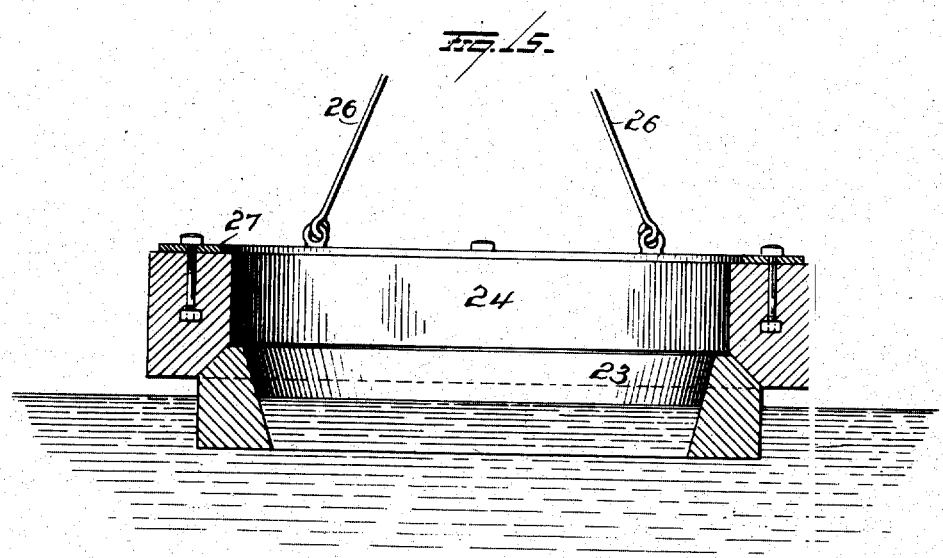

UNITED STATES PATENT OFFICE.

MACK J. HEALY, OF BRADFORD, PENNSYLVANIA, ASSIGNOR TO CONSOLIDATED WINDOW GLASS COMPANY, OF BRADFORD, PENNSYLVANIA.

APPARATUS FOR DRAWING HOLLOW GLASS ARTICLES.

1,008,465.  Specification of Letters Patent. Patented Nov. 14, 1911.

Application filed March 12, 1910. Serial No. 548,937.

*To all whom it may concern:*

Be it known that I, MACK J. HEALY, of Bradford, in the county of McKean and State of Pennsylvania, have invented certain new and useful Improvements in Apparatus for Drawing Hollow Glass Articles; and I do hereby declare the following to be a full, clear, and exact description of the invention, such as will enable others skilled in the art to which it appertains to make and use the same.

My invention relates to an improvement in apparatus for drawing hollow glass articles, such as the cylinders used for making window glass. The object being to dispense with the use of forehearths or dog houses, and draw the glass directly from the tank.

A further object is to so construct the tank that the cylinder will be drawn from a shallow depth, while maintaining a deeper and larger volume of glass at the sides and at the rear of the drawing openings, thereby cooling the glass, and maintaining the same immediately under the drawing opening, at a temperature and consistency which will permit of the rapid drawing of a cylinder of uniform thickness, while the hotter volume of glass at the sides and at the rear of the drawing opening, rapidly remelts the glass left in the ring after severing the cylinder.

With these and other objects in view, my invention consists in parts and combinations of parts of the tank as will be more fully described and pointed out in the claims.

In the accompanying drawings Figure 1 is a view in elevation of a section of a tank showing my improvement. Fig. 2 is a plan view of same. Fig. 3 is a view in horizontal section of the tank having four drawing openings. Fig. 4 is a view in vertical section through a portion of the tank and one drawing opening. Fig. 5 is a view in plan of one drawing opening. Fig. 6 is a view in vertical section on the line A—B of Fig. 4. Fig. 7 is a view from the inside of the tank looking toward the piers and shades. Figs. 8 and 9 are views in plan and side elevation respectively of the side shades. Fig. 10 shows views in plan, edge and end elevations of one of the top stones. Figs. 11, 12 and 13 are views in plan, side and front elevation respectively of the pier crown. Fig. 14 shows views in plan and edge elevation of one of the back shades, and Fig. 15 is a view in section of the ring shield and one of the floating rings, showing the means for centering the latter.

In the drawings, I have shown part of a melting tank provided with an enlarged semi-circular end as shown in Fig. 3, in which the drawing openings are located, all forehearth or other projections from the tank being dispensed with. While I have shown a tank with four drawing openings, I would have it understood that the number is immaterial. The cap 1 of the tank is supported at its edge on the breast wall 2, and by any other supports that may be found necessary, and is provided at the semicircular end of the tank, with one or more openings 3, immediately under which, and on the floor or base 4 of the tank, are two courses of clay block 5 covered by a slab 6, the latter being overlapped and held down at its front or outer end by a projection from the breast wall 2, and at its rear end by a projection 7 from the pier 8, as clearly shown in Fig. 4. There is a pier 8 in rear of each drawing opening in the tank, and a raised bottom under each opening, while at the sides of each slab 6, and hence between the several drawing openings, the floor of the tank is at a lower level and preferably in the plane of the floor or base at the rear of the piers. This provides for a reduction in the depth of the glass immediately under the drawing opening, with an increased depth at the sides, consequently as soon as the floating ring from which the cylinder has been drawn, is forced from under the opening to one side, it then becomes subjected to the intense heat of the larger volume of glass, which rapidly melts back the glass left after severing the cylinder, so that by the time the floating ring makes the circuit, to wit, out at one side, back and around the pier to the other side of the drawing opening, it has been thoroughly reheated and cleared of the adhering glass. The breast wall 2 and piers 8 extend above the level of the glass, and as shown in Fig. 3, the piers are sufficiently far apart to permit the floating rings to be freely moved and manipulated between them. Each pier 8 is capped by a refractory clay crown piece 9 which latter projects at the front, and is curved as shown in Figs. 2 and 4, to form the rear portion of the top stone, the open center of which latter constitutes the drawing opening. Located on the breast wall at the front of each drawing point of the furnace, are front top stones 10, (three in the present instance) the rear edges of which are curved in the arcs of a circle and constitute the front of the drawing opening, the sides of the latter being formed integral as at 11, with the side shades 12. The top stones are formed of refractory clay, and when thus formed and placed in position, rest in a plane above the level of the molten glass, and sufficiently high above same, to permit the floating rings to be readily moved into and out of position under the drawing opening. The front stones 10 are seated on, and supported by the breast wall of the tank.

Superimposed on the pier crown 9 are the rear bottom shades 14, 15 and 16, the first of which projects forwardly slightly beyond the others, as shown in Fig. 4, to form seats or shoulders against which shoulders 17 on the rear edge of the side shades 12 rest, and by which the said side shades are partly supported. The rear bottom shades 14, 15 and 16 are curved at their fronts as shown in Figs. 1 and 4, and are capped by the rear top shade 18, which is also curved to conform to the curvature of the lower rear shades and passes up through the opening 3 in the cap 1, without contacting with the latter, and terminates in a plane above the adjacent edges of the cap. The side shades 12, are each preferably made in two sections connected by mortise and tenon joint, and their upper edges are inclined upwardly from the front to the rear. The front ends rest on the front top stones 10 at the side edges of the latter, and they are supported at their rear edges upon the pier crown and rear bottom shade 14, the sections 11 of the side shades completing the circular drawing opening in the top stones. The side shades diverge outwardly as shown in Figs. 1 and 5 thus providing ample room and space at the front for the manipulation of the rings and also for severing the cylinder.

In the present instance I have provided screws 19 mounted in supports carried by the channel irons 13, for forcing the blocks 20 against the outer ends of the side shades, so as to provide and compensate for expansion while the tank is hot, and to take up the contraction as the fires are withdrawn from the tank. The channel irons 13 are located at intervals around the tank for bracing the latter, and are connected by the tie rods 21, which support them at the top.

The cap or arch 1, is sprung from the breast wall over the tank, and as before explained, the openings 3 therein are larger than the shades and are wholly disconnected from the latter and from the piers 8, so that any movement of the same due to expansion or contraction, will not be communicated to the shades, nor will any movement of the latter have any effect on the cap.

As shown in Fig. 7, the pier crown is cut away on its underside at the rear as at 9ª, so as to provide ample room for the free passage of the floating rings 23 around the pier, from one side of the drawing opening to the other.

With the construction above described it will be seen that the depth of molten glass immediately under the drawing opening is less than at the sides and at the rear. The cylinder being drawn is however protected from the rear by the piers, and at the sides by the floating ring 23, ring shield 24, top stones and shades, and is only exposed from below, to the mass of glass immediately below.

The floating rings 23 above referred to are of the ordinary construction and material and are moved from under the drawing opening, and into position under said opening, by hooked rods operated through suitable openings in the breast wall of tank. After a cylinder has been drawn, the floating ring with the cooled glass adhering to and within the same, is pushed from under the drawing opening to the side and gradually around the pier to the opposite side. During its movement around the pier, the intense heat remelts the glass therein and puts the ring and the glass therein in condition for another drawing. A series of floating rings, usually three, are provided for each drawing opening, hence after using one, another is ready for use without the loss of any time other than that necessary to placing it in position. This floating ring is centered and held in position immediately under the drawing opening by a ring shield 24. This shield is slightly smaller than the drawing opening so as to freely pass through or into same, and is of a size to embrace the floating ring 23 and retain the latter centrally under the drawing opening. This ring shield 24 is suspended by suitable counterweighted hoisting cables 26 by which it is raised in order to permit the floating ring 23 to be moved out, and another ring to be moved into place. After a floating ring has been placed under the drawing opening, the ring shield is lowered and thus assists, as before explained, in shielding the cylinder from the heat of the mass of molten glass except that within and immediately below the floating ring. The ring shield 24 is made of suitable refractory material and is provided at its top with a metal ring 27 bolted thereto, the bolts being sealed within the shield to protect them from the direct heat.

By the improvements above described I obtain all the advantages incidental to drawing from a pot, without the loss of time and expense of ladling and as the cylinders are drawn directly from the tank the operation may be a continuous one.

It is evident that many slight changes might be resorted to in the relative arrangement of the parts shown and described without departing from the spirit and scope of my invention hence I would have it understood that I do not wish to confine myself to the exact construction and arrangement of parts shown and described, but Having fully described my invention what I claim as new and desire to secure by Letters-Patent, is:—

1. Apparatus for drawing glass articles comprising a tank having a series of drawing openings therein and a pier within the tank in rear of each drawing opening, the floor or base of those parts of the tank in front of the piers and under the drawing openings being in a plane above the floor or base intermediate the drawing openings.

2. Apparatus for drawing glass articles comprising a tank having a series of top stones each having a drawing opening therein, and a pier within the tank and supporting the rear end of each top stone, those portions of the floor of the tank in front of the piers and under the topstones being in a plane above the floor intermediate the piers and topstones.

3. Apparatus for drawing glass articles comprising a tank the cap of which has an opening therein, a pier located at the rear of said opening, a top stone supported by the breast wall and pier and having a drawing opening therein and shades on said top stones at the sides and back of the drawing opening and extending up into the opening in the cap of the tank.

4. Apparatus for drawing glass articles comprising a tank, the cap of which has an opening therein, the floor of the tank immediately below said opening being in a plane above the floor of the tank at the sides of the opening, a pier located at the rear of said opening, a top stone supported by the breast wall and pier and having a drawing opening therein, and a shade on said top stone and pier at the sides and back of the drawing opening and extending up into the opening in the cap of the tank.

5. Apparatus for drawing glass articles, comprising a melting tank the cap of which is provided with an opening, a pier at the rear of said opening, top stones supported by the breast wall of the tank and the pier, the said top stones having a drawing opening therein, and a shade on the top stone and pier, the said shade extending up to the cap but not connected to the latter.

6. Apparatus for drawing glass articles comprising a melting tank having an opening in its cap, a raised floor immediately below said opening, a pier at the rear of said opening, a sectional top stone supported by the breast wall of the tank and by the pier, the said top stone having the drawing opening therein, and a shade closing the tank between the outer edges of the top stone and cap but disconnected from the latter so as to permit either to expand or contract independently of the latter.

7. Apparatus for drawing glass articles comprising a melting tank having an opening in its cap, a pier at the rear of said opening, a sectional horizontal top stone the sections of which are supported by the breast wall of the tank and by the pier and provided with a drawing opening and a sectional shade at the sides and rear of said opening and extending from the horizontal or top stones up and through the cap.

8. Apparatus for drawing glass articles comprising a tank having an opening through its cap, a raised floor immediately below said opening, a pier in rear of the opening, a sectional top stone resting on the breast wall and on the pier, sectional sides and back shades on the top stone and pier and adjustable means for applying pressure against the ends of the side shades for holding the sections of same together.

9. Apparatus for drawing glass comprising a tank having an opening through its top, a pier at the rear of said opening, the said pier being cut away at its sides immediately below its crown, a sectional top stone having a drawing opening therein, the said stone being supported on the breast wall of the tank and by the pier crown a sectional back and side shade on said top stone, supported by the latter and by the pier, and a floating ring adapted to be moved into position under the drawing opening.

10. Apparatus for drawing glass comprising a tank the cap of which is provided with an opening, that portion of the floor of the tank immediately under said opening being raised, a pier at the rear of the raised section of the floor, a sectional top stone supported by the breast wall of the tank and by the pier, a sectional shade, sections of which have mortise and tenon joints and adjustable means for holding the sections of said shade in proper relative position, the said shade closing the tank between the top stone and cap, but disconnected from the latter.

11. A glass drawing apparatus, comprising a tank having an opening in its cap, that portion of the floor of the tank beneath said opening being raised above the plane of the floor at the sides of said opening, a pier at the rear of the opening, a sectional top stone carried by the pier and breast wall and having a drawing opening therein, a shade on said top stone, and extending through the opening in the cap of the tank, and a counterbalanced shield ring suspended within the drawing opening in the top stone.

12. A glass drawing apparatus comprising a tank having an opening through its cap, a raised floor immediately under said opening, a pier at the rear of said raised floor, a horizontal top stone having a drawing opening therein, a sectional side and rear shade supported by the top stone and pier, and extending up through the opening in the cap of the tank and a counterbalanced shield ring.

13. Apparatus for drawing glass articles comprising a tank having an opening through its cap, a pier in rear of said opening, a sectional top stone resting on the breast wall and on the pier, sectional side and back shades on the top stone and piers and adjustable means for applying pressure against the ends of the side shades for holding the sections of same together.

14. Apparatus for drawing glass comprising a tank the cap of which is provided with an opening, a pier within the tank at the rear of the opening in the cap, a sectional top stone supported by the breast wall of the tank and by the pier, a sectional shade, sections of which have mortise and tenon joints, and adjustable means for holding the sections of said shade in proper relative positions, the said shade closing the tank between the top stone and cap, but disconnected from the latter.

15. A glass drawing apparatus comprising a tank having an opening in its cap, a pier at the rear of said opening, a sectional top stone carried by the pier and breast wall and having a drawing opening therein, a shade on said top stone, the said shade extending through the opening in the cap of the tank and a counterbalanced shield ring suspended within the drawing opening in the top stone.

16. A glass drawing apparatus comprising a tank having an opening through its cap, a pier at the rear of said opening, a horizontal top stone having a drawing opening therein, a sectional side and rear shade supported by the top stone and pier and extending up through the opening in the cap of the tank and a counterbalanced ring shield.

In testimony whereof, I have signed this specification in the presence of two subscribing witnesses.

MACK J. HEALY.

Witnesses:
W. C. PURPLE,
ADA M. MILLER.

---

Copies of this patent may be obtained for five cents each, by addressing the "Commissioner of Patents, Washington, D. C."